Oct. 8, 1968 JEAN-MARIE MASSOUBRE 3,404,721
PNEUMATIC TIRES
Filed Dec. 15, 1965
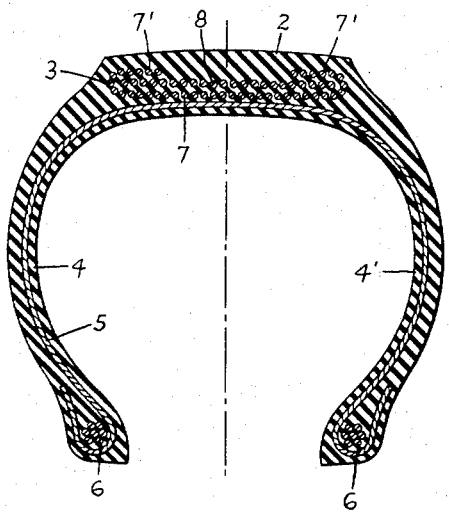
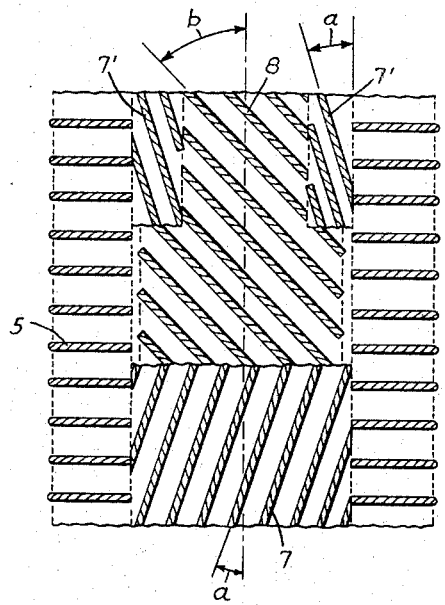
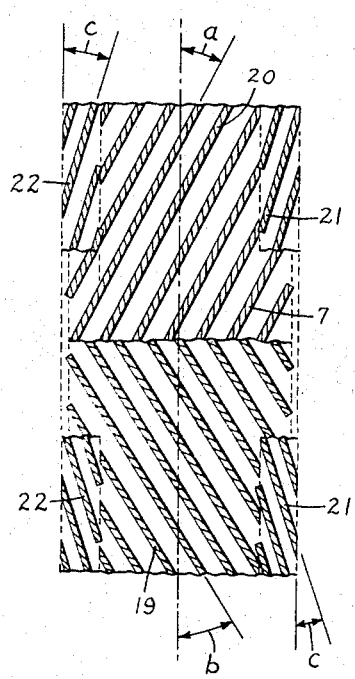
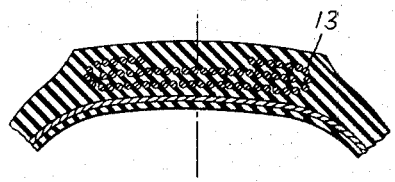
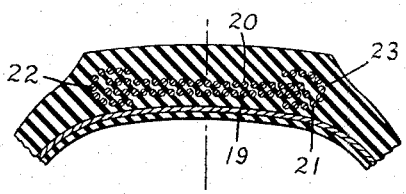
INVENTOR
JEAN-MARIE MASSOUBRE
BY
HIS ATTORNEYS United States Patent Office 3,404,721
Patented Oct. 8, 1968

3,404,721
PNEUMATIC TIRES
Jean-Marie Massoubre, Clermont-Ferrand, France, assignor to Compagnie Generale des Etablissements Michelin, raison sociale Michelin & Cie, Clermont-Ferrand, Puy-de-Dome, France
Filed Dec. 15, 1965, Ser. No. 514,005
Claims priority, application France, Dec. 22, 1964, 1,815
6 Claims. (Cl. 152—361)

ABSTRACT OF THE DISCLOSURE

A pneumatic tire having a crown reinforcement composed of plies of cables, at least one ply being substantially co-extensive with the tread and other ply or plies having edge portions folded around the first-mentioned ply adjacent to the edges of the tread, the cables of the folded ply having a modulus of elasticity less than 5000 kg./mm.$^2$ and preferably about 280 to 1500 kg./mm.$^2$, and the first mentioned ply containing cables made of material having a modulus of elasticity of over 2500 kg./mm.$^2$, and preferably between about 5,000 and 20,000 kg./mm.$^2$, the plies of the reinforcement stiffening the edges of the tread and reducing any tendency for ply or tread separation and increasing the roadability of the tire at reasonable inflation pressures and reducing the rolling resistance of the tire.

This invention relates to improvements in pneumatic tires of the tubeless and tube-containing type, and it relates particularly to improvements in tread or crown reinforcements for such pneumatic tires.

The provision of a plurality of tread-reinforcing or crown plies in tires substantially co-extensive with the tread of a tire and outside of the carcass of the tire is well known and its advantages are well recognized. When the crown reinforcements are formed of metallic cables, the roadability of the tire and its resistance to damage are greatly enhanced. When the crown plies are formed of cables of artificial, natural or synthetic textile fibers, the roadability of the tire is improved but is not as great as with metallic cable plies even when the tire contains a great many crown plies or when the tire is inflated to a pressure which renders the riding comfort of the tire unsatisfactory. In each of these types of tires, the edges of the crown reinforcing plies are unconnected with each other and the stresses exerted on the individual cables become somewhat unequal throughout the length of the cable. Moreover, stresses are set up which tend to cause a separation of the cable ends from the rubber in which they are encased, thereby resulting in a gradual ply separation, particularly under conditions of high speed use.

It has been proposed to overcome the separation at the edges of the plies by folding one of the crown reinforcing plies over the edge of another crown reinforcing ply or providing folded-over narrower plies which extend over the edges of the crown reinforcing plies. This has the effect of stiffening the lateral edges of the tread and interlocks them to the extent that the crown reinforcement as a whole acts more uniformly in avoiding shifting of the cables, and particularly the ends of the cables. However, the provision of such folded-over plies has not been very successful for, when metal cable plies are used, it has been found that they tend to break along the fold lines of the folded ply. On the other hand, when the plies of natural, artificial or synthetic fiber cables are used, breakage does not occur but, nevertheless, the roadability of the tire is less satisfactory than when metal cable plies are used.

In accordance with the present invention, crown ply reinforcements are provided which enable the use of folded-over portions on one of the plies to reinforce the edges of another ply or other plies without the disadvantages which are attendant upon the use of such folded plies in the prior tires. More particularly, breakage of the plies at the fold line is avoided, better roadability is obtained and a greater operating life results for the reason that separation at the ends of the cables is virtually eliminated.

Further, in accordance with the present invention, the crown reinforcement includes one non-folded ply which extends substantially co-extensive with the tread and at least one additional ply which is folded to enclose the edges of the non-folded ply, and further in providing cables in the folded ply which have a modulus of elasticity of less than 5000 kg./mm.$^2$, and preferably between about 280 and 1500 kg./mm.$^2$, and in providing the non-folded ply with cables made from a material having a modulus of elasticity of over 2500 kg./mm.$^2$, and preferably between about 5000 and 20,000 kg./mm.$^2$. In another form of the invention, two or more unfolded plies are enclosed at their edges in narrow lateral plies which are folded to a generally U-shaped cross-section. In this modification, the folded plies should be of low modulus of elasticity as indicated above, while at least one of the unfolded plies has cables made from a material having a modulus of elasticity above 2500 kg./mm.$^2$, and preferably between 5000 and 20,000 kg./mm.$^2$.

The term "modulus of elasticity" indicates the number E in the equation $$\frac{F}{S} = E\frac{dl}{l}$$

in which S and $l$ indicate, respectively, the initial net cross-section and the length of a cable sample, $dl$ is its elongation when subjected to a force F equal to one-tenth of the rupture load of cable. The term "modulus of elasticity of the cable material" designates a similar number which is measured on a homogeneous sample of the material from which the cable is made.

The following table sets forth the moduli of elasticity of a number of different types of cables suitable for use in accordance with the present invention in the crown reinforcement of the tire, and the modulus of elasticity of the material of which these cables are made. The values of the moduli indicated in the following table are approximate.

TABLE I

| Description of cable | Moldulus of elasticity (kg./mm.$^2$) | |
|---|---|---|
| | of cable | of material |
| (1) Non-elastic metal cable composed of 7 strands of 3 steel wires with 0.23 mm. diameter; carbon content=0.7%; pitch of twist=18 mm. | 20,000 | 21,000 |
| (2) Elastic metal cable fabricated according to Boussu et al., U.S. Patents Nos. 3,090,189 and 3,090,190, both dated May 21, 1963, composed of 3 strands of 7 steel wires with 0.23 mm. diameter; carbon content=0.7%; twist pitch=6 mm. | 1,000 | 21,000 |
| (3) Fiber glass cable, Owens Corning Fiber Glass ECG 150 10 x 3 | 6,000 | 7,000 |
| (4) Standard viscose rayon cable composed of 2 twists of 1650 deniers each; humidity content=6.5% | 760 | 1,800 |
| (5) Polyamide (nylon) cable consisting of three twists of 840 deniers each; humidity content=1.7% | 280 | (¹) |
| (6) Polyester (dacron) cable consisting of three twists of 1100 deniers each; humidity content=1.5% | 990 | (²) |

¹ 200 to 800, according to treatment.
² 500 to 1,000, according to treatment.

The examples of materials from which the cables are made show values of modulus of elasticity ranging between 200 and 21,000 kg./mm.² from which cables can be made having a modulus of elasticity of practically any value between 280 and 20,000 kg./mm.². For example, metal cables can be manufactured using the same kind of steel wires but varying the number of wires per strand, the number of strands, the cabling pitch to produce moduli of elasticity between less than 1000 and more than 20,000 kg./mm.². Generally, the same may be said of cables formed of other materials in which a wide range of moduli of elasticity can be obtained, and any of such cables can be used in accordance with the invention so long as they satisfy the requirement that the folded plies have a modulus of elasticity less than 5000 kg./mm.² and optimally between 280 and 1500 kg., while the material from which the cable of the enclosed or unfolded plies are made has a modulus of elasticity above 2500 kg. and preferably between 5000 and 20,000 kg.

In arranging the cables in the crown plies, it is desirable to dispose them in the angular relations disclosed in the Massoubre United States application Ser. No. 514,004 filed on an even date, now Patent No. 3,357,470, and also to provide the width of the folded back portion in accordance with the disclosure of this application. If all the non-folded plies are not made up of identical cables, in any given tread reinforcement according to the invention, it is preferable that the ply, the cables of which are made from a material having a modulus of elasticity above 2500 kg., contains parallel cables which are perpendicular to the diagonal of a parallelogram, the other diagonal of which is parallel either to the longitudinal direction or to the transverse direction of the tire and the parallelogram having one pair of its sides parallel respectively to the cables of this particular ply and the other pair of sides parallel to the cables of an adjacent ply. The extent of overlap of the folded edges of the folded ply should be not less than 10 mm. and up to about 20% of the width of the ply.

For a better understanding of the present invention, reference may be had to the accompanying drawings in which:

FIGURE 1 is a view in cross-section of a portion of the tire having a substantially cylindrical crown reinforcement;

FIGURE 2 is a developed sectional view in the reinforcement of the crown disclosed in FIGURE 1;

FIGURE 3 is a view in partial cross-section of a tire having a crown reinforcement provided with a transverse curvature;

FIGURE 4 is a cross-sectional view of a modification of the crown reinforcement embodying the invention; and FIGURE 5 is a developed sectional view of the crown reinforcement disclosed in FIGURE 4.

In the cross-sectional views (FIGS. 1, 3 and 4), the cables of which the crown reinforcement is composed are represented as being very close to each other as they actually occur in the tire. For clarity, in disclosing the relations of the cables in the plies, only a few of the cables are shown in widely spaced relation in the developed views (FIGS. 2 and 5).

As shown in FIGURE 1, a typical tire embodying the invention includes a tread 2, a crown reinforcement 3, two sidewalls 4 and 4' and a carcass 5 composed of radial cables which extend through the sidewalls and behind the tread and are folded around the bead wires 6 in the beads of the tire. In the tire of FIGURE 1, the crown reinforcement is substantially cylindrical in shape, that is, transversely flat. As illustrated in FIGURES 1 and 2, the crown reinforcement 3 includes a ply 7 of cables having its edge portions 7' folded over and around the edges of a ply of cables 8.

The following table discloses the characteristics of the cables in two tires No. 1 and No. 2 as disclosed in FIGS. 1 and 2 which are made in accordance with the present invention, and a third tire No. 3 which is not made in accordance with the present invention.

TABLE II.—CABLES

| Tire No. | Ply reference | Composition | Angle a | Angle b | Modulus, kg./mm.² approx. | Modulus, kg./mm.² of material, approx. |
|---|---|---|---|---|---|---|
| 1 | 7 | Polyamide, 3 twists, 840 deniers each | 17° right | | 280 | |
| | 7' | Same as above | | 17° left | 280 | |
| | 8 | Steel, 7 strands with 3 wires of 0.23 mm. diameter; pitch 18 mm. | | 38° left | 20,000 | 21,000 |
| 2 | 7 | Steel, 3 strands with 7 wires of 0.23 mm. diameter; pitch 6 mm. | 17° right | | 1,000 | 21,000 |
| | 7' | Same | | 17° left | 1,000 | 21,000 |
| | 8 | Same, pitch 8 mm | | 38° left | 1,500 | 21,000 |
| 3 | 7 | Polyamide, 4 twists of 1680 deniers each | 17° right | | 400 | 600 |
| | 7' | Same | | 17° left | 400 | 600 |
| | 8 | Same | | 38° left | 400 | 600 |

It will be seen that in tire casings Nos. 1 and 2 the ply 7 with the folded edges 7' is composed of cables having a low modulus of elasticity, that is, they are quite elastic, while the unfolded ply 8 is of a much higher modulus of elasticity. Tire No. 3, on the other hand, is formed of plies of polyamide cables having a relatively low modulus of elasticity. The effect of the cables on the roadability of the tires is illustrated in the following table.

TABLE III

| Tire No. | Constant thrust to produce a deflection angle of 2° under a load of 400 kg. for an inflated pressure of— | | | |
|---|---|---|---|---|
| | 1.4 kg..cm.² | 1.6 kg..cm.² | 1.8 kg..cm.² | 2.0 kg..cm.² |
| 1 | 149 | 159 | 165 | 170 |
| 2 | 154 | 161 | 169 | 176 |
| 3 | 126 | 135 | 142 | 149 |

In making the above test, the tires are subjected to a lateral thrust while under a load of 400 kg. to produce a deflection of 2°. The thrust is measured to indicate roadability, i.e., road grip. It will be apparent from the table that tire No. 3 does not attain a road grip of 149 until it is inflated to a pressure of 2.0 kg./cm.². The No. 1 has a road grip of 149 at 1.4 kg./cm.² inflation pressure. The riding comfort of tire No. 3 is very unsatisfactory at a pressure of 2.0 kg./cm.² while the riding comfort of tires Nos. 1 and 2 is very good at the lower inflation pressures (1.4 kg./cm.²).

It should also be understood that the angular relation of the cables of the plies in tire No. 3 has advantages over standard tires in which different inclinations of the cords are commonly used.

The same advantages are attained when the crown reinforcement has a transverse curvature as illustrated, for example, in FIGURE 3. In this tire, the crown reinforcement 13 has a radius of transverse curvature which is equal to about one-half to two-thirds of the radius of curvature of the reinforcement in the longitudinal direction of the tire.

The following table indicates the arrangement of plies in the tire disclosed in FIGURE 3.

TABLE IV.—CABLES

| Tire No. | Ply reference | Composition | Angle a | Angle b | Modulus, kg/mm.² approx. | Modulus, kg./mm.² of material, approx. |
|---|---|---|---|---|---|---|
| 4 | 17 | Polyamide, 4 twists, 1,680 deniers each | 17° right | | 450 | |
| | 17' | Same | 17° left | | | |
| | 18 | Glass, Owens Corning Fiber Glass ECG 150 10 x 3 | | 38° left | 6,000 | 7,000 |
| 5 | 17 | Polyamide, 4 twists, 1,680 deniers each | 17° right | | 450 | |
| | 17' | Same | 17° left | | | |
| | 18 | Steel, 4 wires of 0.23 mm., pitch 9 mm | | 38° left | 16,000 | 21,000 |
| 6 | 17 | Polyamide, 3 twists, 840 deniers each | 17° right | | 280 | |
| | 17' | Same | 17° left | | 280 | |
| | 18 | Steel, 10 wires of 0.18 mm., pitch 9 mm | | 38° left | 18,000 | 21,000 |

Deflection tests of the tire described above, as well as speed and rolling resistance tests were conducted on tires Nos. 4, 5 and 6 with the results set forth in the following table.

TABLE V

| Tire No. | Deflection thrust | Speed limit (km./h.) | Resistance to rolling (kg./t.) |
|---|---|---|---|
| 4 | 165 | 223 | 16.5 |
| 5 | 154 | 223 | 18.0 |
| 6 | 162 | 213 | 17.0 |

The deflection thrust determines a deflection angle of 2° under a load of 475 kg. with an inflation pressure of 1.8 kg./cm. The speed limit is the speed at which the tire shows damage preventing continuation of the test, and the resistance to travel is measured with a load of 1000 kg. with the tire rolling on a horizontal plane.

All of these tires which are made in accordance with the present invention have high road gripping power as measured by the deflection thrust and are capable of high speed operation while at the same time have lower rolling resistance than conventional tires.

FIGURES 4 and 5 show a modification of the above-described tire casings in which the crown reinforcement 23 contains two main plies 19 and 20 of steel cables having a modulus of elasticity of approximately 18,000 kg./mm.². The cables of the ply 19 are inclined to the left while those of ply 20 are inclined to the right, forming angles $a$ and $b$ with the longitudinal direction of the tire of 28° and 32°, respectively. The edges of these two plies are enclosed in the folds of lateral plies 21 and 22 which are folded in the U-form and are composed of polyamide cables with three twists of 840 deniers each. The cables of plies 21 and 22 form an angle $c$ of 17° and have a modulus of elasticity of about 280 kg./mm.². The reinforcement 23 has practically no transverse curvature. The characteristics of this type of reinforcement are set forth in the following table.

Constant thrust of deflection of 2° with a 400 kg. load, with an inflation pressure of—

| | |
|---|---|
| 1.4 kg./cm.² | 136 |
| 1.6 kg./cm.² | 144 |
| 1.8 kg./cm.² | 149 |
| 2.0 kg./cm.² | 154 |

Speed limit, 213 km./h.
Resistance to rolling, 20 kg./t.

The angles of the cables and the plies 19 and 20 do not have the values disclosed in the Massoubre U.S. application Ser. No. 514,004 filed on even date, but nevertheless the deflection thrusts are greater than those obtained with the reinforcement in tire No. 3 (Table II) which does have the preferred cable inclinations but not the preferred moduli of elasticity of the cables thereby indicating the improvement obtained with the relationship of crown plies embodying the present invention.

It will be understood that other ply arrangements and other types of cables can be used than those disclosed in the specific examples given herein without departing from the invention. For example, almost any arrangement of crown plies is possible so long as at least one of the crown reinforcing plies is made of cables from a material having a high modulus of elasticity and has its edges enclosed by folded edges of crown reinforcing plies or lateral plies of cables having a low modulus of elasticity within the ranges indicated above. Accordingly, the exemplary forms of the invention described above should be considered as illustrative and not as limiting the invention as defined in the following claims.

I claim:

1. A pneumatic tire having a tread, sides extending from the edges of said tread and beads at inner edges of said sides and a crown reinforcement in and substantially co-extensive with said tread, said crown reinforcement comprising at least one ply of substantially parallel cables having their ends adjacent to the edges of said tread and at least another ply of substantially parallel cables closely adjacent to said one ply having an edge portion folded around the ends of said cables of said one ply adjacent to the edges of said tread and the ends of said cables of said one ply, the cables of said one ply being made from a material having an average modulus of elasticity between about 5000 kg./mm.² and 20,000 kg./mm.² and the cables of said another ply having an average modulus of elasticity between about 280 kg./mm.² and 5000 kg./mm.².

2. The tire set forth in claim 1 in which the cables of said another ply have a modulus of elasticity between about 280 kg./mm.² and 1500 kg./mm.².

3. The tire set forth in claim 1 in which said another ply is substantially co-extensive with said tread and has opposite lateral edge portions folded around the edges of said one ply and overlapping the edges of said one ply.

4. The tire set forth in claim 1 in which said crown reinforcement comprises a plurality of plies of cables substantially co-extensive with said tread and having lateral edges adjacent to the edges of said tread, and narrower plies of cables folded into substantially U-shaped cross-section and enclosing the lateral edges of said plurality of plies, said cables of said narrow plies having a modulus of elasticity between about 280 kg./mm.² and 1500 kg./mm.².

5. The tire set forth in claim 4 in which cables in one ply of said plurality of plies are inclined relative to and cross the cables in another ply of said plurality of plies.

6. The tire set forth in claim 4 in which the cables of said plurality of plies have substantially the same modulus of elasticity.

References Cited

UNITED STATES PATENTS

| | | | |
|---|---|---|---|
| 3,090,417 | 5/1963 | Spelman | 152—361 |
| 3,093,181 | 6/1963 | Beckadolph | 152—361 |
| 3,166,113 | 1/1965 | Keefe | 152—361 |
| 3,224,481 | 12/1965 | Lugli | 152—361 X |
| 3,233,649 | 2/1966 | Jolivet et al. | 152—361 |
| 3,242,965 | 3/1966 | Mirtain | 152—361 |

DRAYTON E. HOFFMAN, *Primary Examiner.*